(12) United States Patent
Yamada et al.

(10) Patent No.: US 6,515,697 B1
(45) Date of Patent: *Feb. 4, 2003

(54) DIGITAL CAMERA WITH DETACHABLE AUXILIARY MEMORY

(75) Inventors: Masayuki Yamada, Suwa (JP); Urato Aruga, Suwa (JP); Kazuki Itoh, Suwa (JP)

(73) Assignee: Chinon Kabushiki Kaisha, Nagano (JP)

( * ) Notice: Subject to any disclaimer, the term of this patent is extended or adjusted under 35 U.S.C. 154(b) by 168 days.

This patent is subject to a terminal disclaimer.

(21) Appl. No.: 09/672,111

(22) Filed: Sep. 27, 2000

Related U.S. Application Data

(62) Division of application No. 08/705,601, filed on Aug. 30, 1996, now Pat. No. 6,239,837.

(30) Foreign Application Priority Data

Sep. 5, 1995 (JP) ............................................. 7-228114

(51) Int. Cl.⁷ ................................................. H04N 5/76
(52) U.S. Cl. ....................................... 348/231; 348/233
(58) Field of Search ................................. 348/207, 222, 348/231, 230, 233, 232, 373, 374, 375; 358/906, 909.1

(56) References Cited

U.S. PATENT DOCUMENTS

| | | | |
|---|---|---|---|
| 5,091,787 A | 2/1992 | Watanabe et al. | |
| 5,473,370 A | 12/1995 | Moroanga et al. | |
| 5,648,816 A | * 7/1997 | Wakui | ........................ 348/233 |
| 5,956,084 A | * 9/1999 | Moronaga et al. | .......... 348/233 |
| 6,239,837 B1 | * 5/2001 | Yamada et al. | ............. 348/231 |

* cited by examiner

Primary Examiner—Aung S. Moe
(74) Attorney, Agent, or Firm—Oppenheimer Wolff & Donnelly LLP

(57) ABSTRACT

In a digital camera, the state of copying is monitored and displayed when image data stored in a main memory are copied to an auxiliary memory, and data for preventing illegal copying are added thereto, in order to improve operability and reliability. When a copying mode is designated, the image data stored in the main memory MM upon photographing are transferred and copied to a detachable auxiliary memory MC by way of a bus B. During copying, the number of uncopied image data in the main memory MM and the number of image data which can be copied to the auxiliary memory MC are sequentially displayed in a liquid crystal display section 30, while each image data is copied with management data indicative of the date and time of copying or the like added thereto. Also, flag data indicating that copying is in progress and that copying has been completed are added thereto. Further, when the auxiliary memory MC is attached to or detached from the camera during copying or photographing, the system is forcibly reset, thereby preventing abnormality from occurring beforehand.

6 Claims, 8 Drawing Sheets

Fig. 6

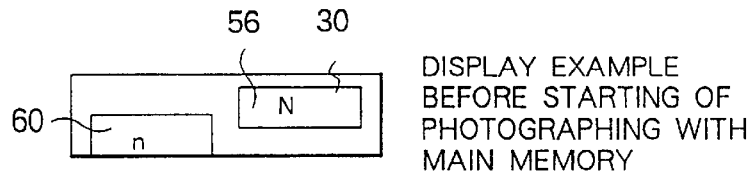

DISPLAY EXAMPLE
BEFORE STARTING OF
PHOTOGRAPHING WITH
MAIN MEMORY

Fig. 7

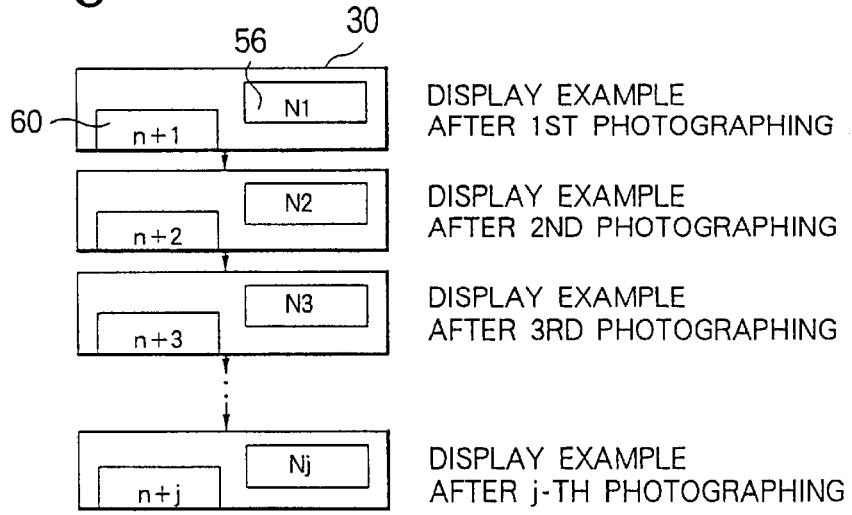

DISPLAY EXAMPLE
AFTER 1ST PHOTOGRAPHING

DISPLAY EXAMPLE
AFTER 2ND PHOTOGRAPHING

DISPLAY EXAMPLE
AFTER 3RD PHOTOGRAPHING

DISPLAY EXAMPLE
AFTER j-TH PHOTOGRAPHING

Fig. 8

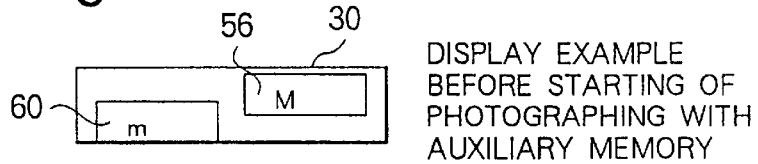

DISPLAY EXAMPLE
BEFORE STARTING OF
PHOTOGRAPHING WITH
AUXILIARY MEMORY

Fig. 9

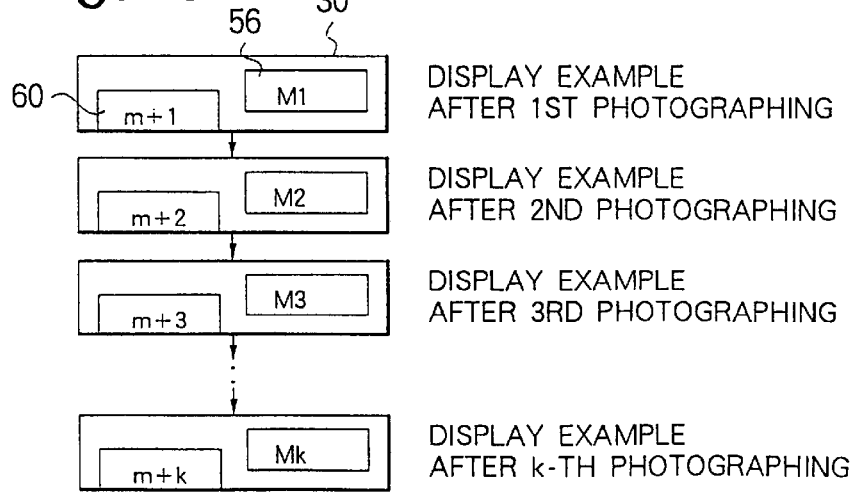

DISPLAY EXAMPLE
AFTER 1ST PHOTOGRAPHING

DISPLAY EXAMPLE
AFTER 2ND PHOTOGRAPHING

DISPLAY EXAMPLE
AFTER 3RD PHOTOGRAPHING

DISPLAY EXAMPLE
AFTER k-TH PHOTOGRAPHING

Fig. 11

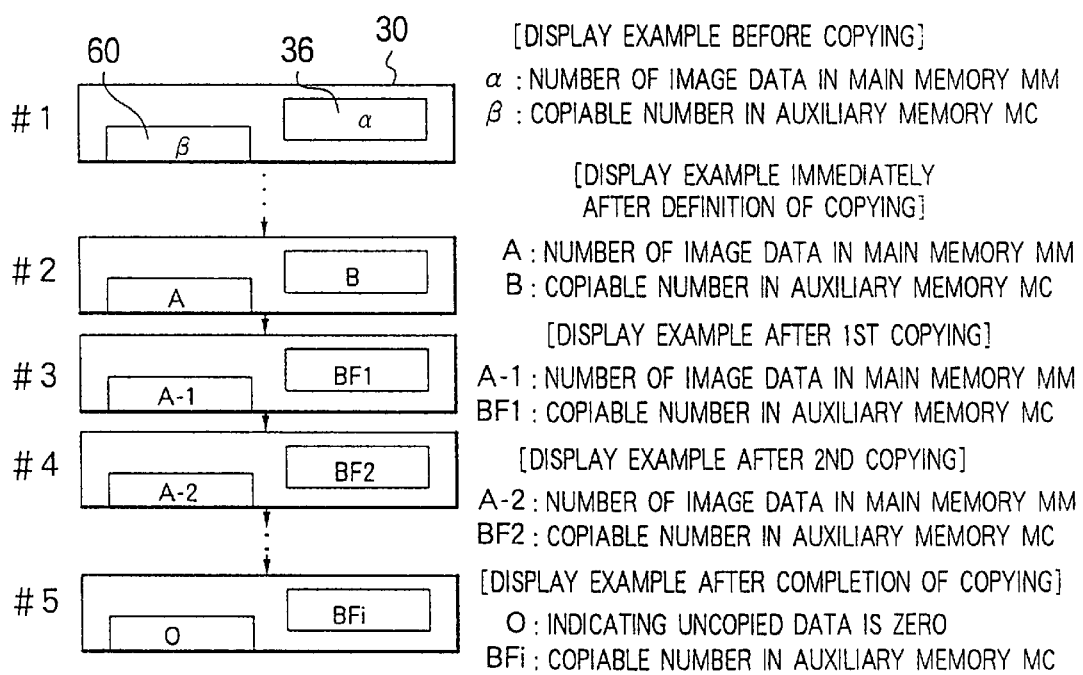

[DISPLAY EXAMPLE BEFORE COPYING]
α : NUMBER OF IMAGE DATA IN MAIN MEMORY MM
β : COPIABLE NUMBER IN AUXILIARY MEMORY MC

[DISPLAY EXAMPLE IMMEDIATELY
AFTER DEFINITION OF COPYING]
A : NUMBER OF IMAGE DATA IN MAIN MEMORY MM
B : COPIABLE NUMBER IN AUXILIARY MEMORY MC

[DISPLAY EXAMPLE AFTER 1ST COPYING]
A-1 : NUMBER OF IMAGE DATA IN MAIN MEMORY MM
BF1 : COPIABLE NUMBER IN AUXILIARY MEMORY MC

[DISPLAY EXAMPLE AFTER 2ND COPYING]
A-2 : NUMBER OF IMAGE DATA IN MAIN MEMORY MM
BF2 : COPIABLE NUMBER IN AUXILIARY MEMORY MC

[DISPLAY EXAMPLE AFTER COMPLETION OF COPYING]
O : INDICATING UNCOPIED DATA IS ZERO
BFi : COPIABLE NUMBER IN AUXILIARY MEMORY MC

DIGITAL CAMERA WITH DETACHABLE AUXILIARY MEMORY

"This is a Divisional application of Application No. 08/705,601 filed on Aug. 30, 1996 now U.S. Pat. No. 6,239,837, which claims priority one Japanese Application No. 228114/1995 filed Sep. 5, 1995.

BACKGROUND OF THE INVENTION

1. Field of the Invention

The present invention relates to a digital camera which digitally records, into an electronic recording medium such as a semiconductor memory, image data of an object obtained by photographing, for example.

2. Related Background Art

Digital cameras can photograph an object in a simple operation similar to that of conventional silver halide cameras, while having a function of converting an image of the object captured by a solid-state imaging device or the like into digital image data and digitally recording these data into a semiconductor memory or the like. Therefore, they have been attracting much attention as a multimedia-aware photographing device applicable to digital electronic devices such as microcomputer.

The digital cameras have excellent functions in that they can provide a variety of forms of utilization to users. For example, they can provide digital image data to various digital electronic devices such that they are repeatedly reproduced and displayed, such that the same image data are copied a number of times, such that the image data are easily edited and processed, and such that unnecessary image are erased while only the necessary image data are stored and managed.

SUMMARY OF THE INVENTION

It is an object of the present invention to provide a digital camera which has a high degree of operability, facilitates data management, and is highly reliable in terms of functions.

In order to achieve such an object, the present invention is a digital camera having a main memory for storing image data obtained by photographing and a connector means for attaching a detachable auxiliary memory thereto, wherein further provided is a control means which, upon detection of attachment of the auxiliary memory to the connector means, causes the image data obtained by photographing to be preemptively stored into the auxiliary memory.

Also, the present invention provides a digital camera having a main memory for storing image data obtained by photographing and a connector for attaching a detachable auxiliary memory thereto, wherein further provided are a control means which causes the image data in the main memory to be transferred and copied to the auxiliary memory according to designation of a copy mode, and a display means which, as designated by the control means, sequentially displays the number of uncopied image data remaining in the main memory and the number of image data which can be copied to the auxiliary memory.

Preferably, while causing the image data in the main memory to be transferred and copied to the auxiliary memory, the control means adds management data indicating fact of copying to each image data.

Preferably, the control means adds, to each image data which is to be copied, a flag data indicating that copying of each data is in progress, and adds, upon completion of copying of each image data, a flag data indicating the completion of copying to each image data which is to be copied.

Preferably, the control means sequentially detects the free capacity of the auxiliary memory; upon detection of shortage of the free capacity in the auxiliary memory before the whole image data in the main memory is completely transferred and copied, temporarily stops transferring and copying operations; and, after detecting that a new auxiliary memory is attached to the connector means, causes the remaining image data to be transferred and copied to the new auxiliary memory.

Preferably, the control means sequentially monitors whether the auxiliary memory is attached to or detached from the connector means and, upon detection of attachment or detachment of the auxiliary memory during transfer of the image data to the main memory or auxiliary memory in a photographing or copying mode, forcibly initializes the internal camera system.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 6 and 7 are explanatory views for explaining contents displayed on the liquid crystal display section at the time of photographing by use of a main memory;

FIGS. 8 and 9 are explanatory views for explaining contents displayed on the liquid crystal display section at the time of photographing by use of an auxiliary memory;

FIG. 11 is an explanatory view for explaining contents displayed on the liquid crystal display section at the time of the copying mode.

DETAILED DESCRIPTION OF THE PREFERRED EMBODIMENTS

Figure 1:
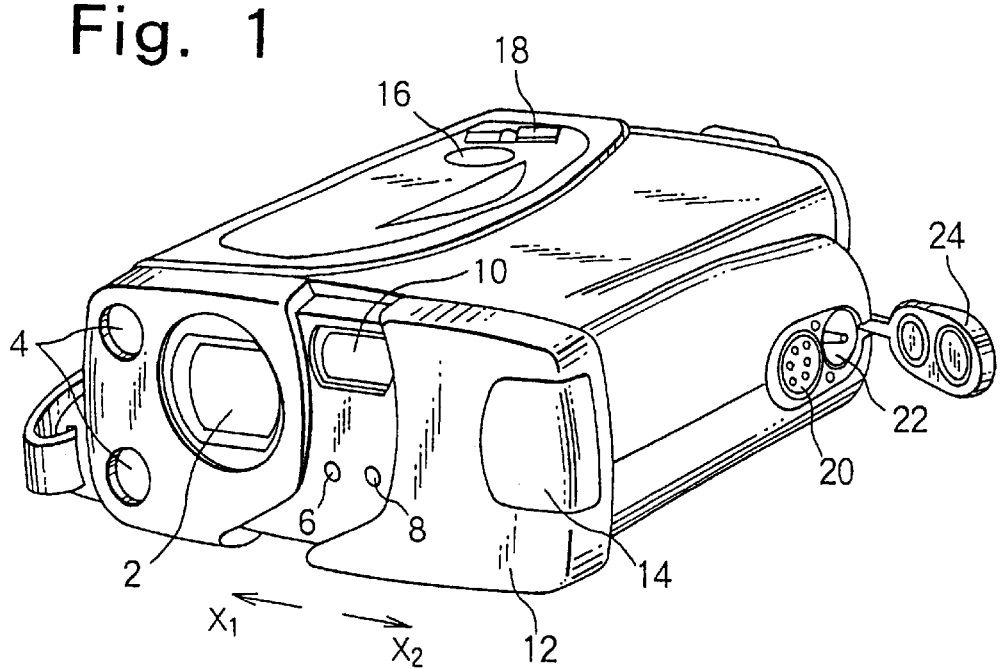
FIG. 1 is a perspective view showing an outer configuration of a digital camera.
Figure 2:
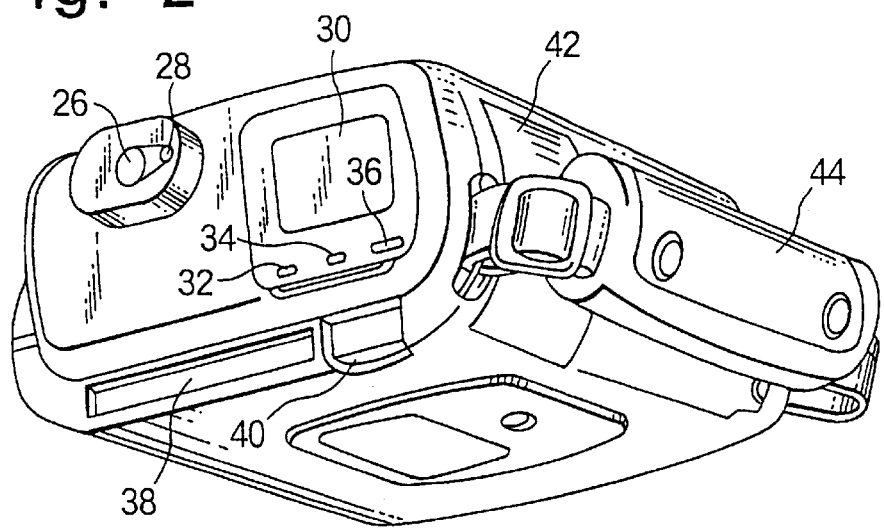
FIG. 2 is a perspective view further showing an outer configuration of the digital camera.
Figure 3:
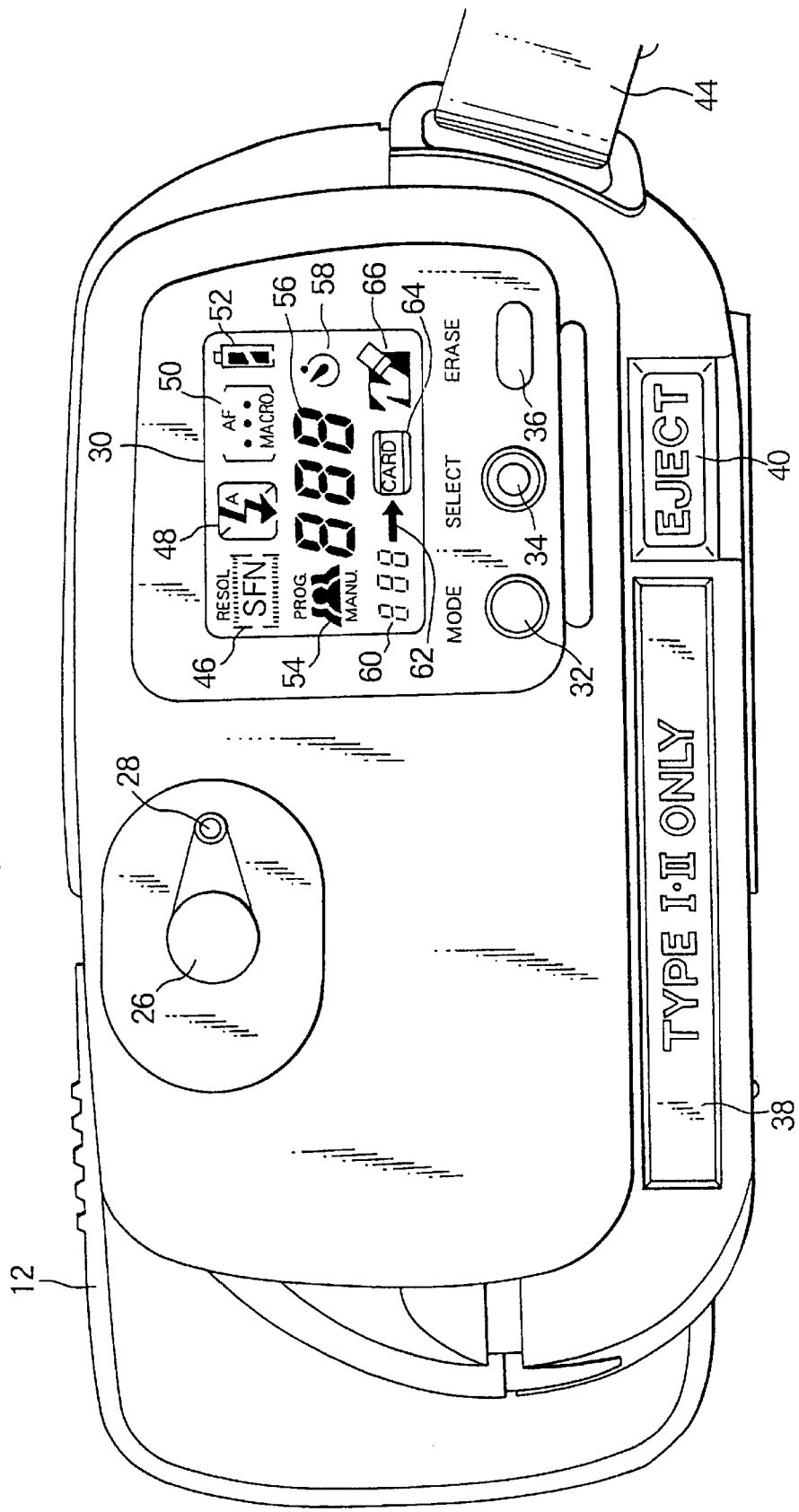
FIG. 3 is a plan view mainly showing a liquid crystal display section of the digital camera under magnification.

In the following, embodiments of the digital camera in accordance with the present invention will be explained with reference to drawings. Here, FIG. 1 is an outer perspective view showing this digital camera from the front face side where an image pickup optical system is provided; FIG. 2 is an outer perspective view showing this digital camera from the back face side where a liquid crystal display section is provided; and FIG. 3 is an enlarged plan view showing the liquid crystal display section and the like provided at the back face of the digital camera.

In FIG. 1, at the front face end of the camera body, disposed are an image pickup optical system 2 which is directed to an object at the time of photographing; an automatic focus detector 4 which performs distance measurement and focus detection; an exposure detecting sensor 6; a light-emitting device 8 which intermittently emits light at the time of photographing by use of a timer; a view finder 10; a slide cover 12 having a main switch which turns on and off a main power source of the camera; and a flash 14 disposed at the slide cover 12.

Here, the automatic focus detector 4 adopts so-called active technique in which, at the time of photographing, its light-emitting device emits light toward an object, and the light reflected by the object is detected by a light-receiving device, whereby the distance to the object and the in-focus state of the image pickup optical system 2 are detected.

Also, the slide cover 12 is disposed so as to be slidable in $X_1$–$X_2$ directions in the drawing. As depicted, when it moves in $X_2$ direction, the above-mentioned main switch turns on the main power source of the camera; whereas, when it moves in $X_1$ direction, the above-mentioned main switch turns off the main power source of the camera, while the exposure detecting sensor 6, the light-emitting device 8, and the view finder 16 are blocked off.

At the upper end of the camera body, provided are a shutter release button 16 and a zoom button 18. As the shutter release button 16 is pushed down, photographing is effected. The zoom button 18 has a telephoto contact (TSW) and a wide-angle contact (WSW). During a period in which the zoom button 18 is turned onto the telephoto contact (TSW) side, so-called zoom-in state is continuously set; whereas during a period in which the zoom button 18 is turned onto the wide-angle contact (WSW) side, so-called zoom-out state is continuously set.

On one side face of the camera body, provided are a serial port 20 for serially transmitting image data obtained by photographing to an external electronic device such as a personal computer; a connector 22 for connecting an external power source thereto; and a cover 24 for blocking off the serial port 20 and the connector 22.

In FIG. 2, at the back face of the camera body, provided are a view finder window 26 equipped with a light-emitting device 28 which intermittently emits light at the time of automatic focus detection; a liquid crystal display section 30 for displaying the state of operation of the camera or various operation modes; a mode switch 32 and a select switch 34 which are operated in order to designate the operation mode of the camera; and an erase switch 36 which is operated in order to erase the image data already stored in a main memory MM and an auxiliary memory MC which will be explained later.

In the lower portion of the back face of the camera body, provided are a card slot 38 for detachably inserting a memory card, i.e., the auxiliary memory MC, thereinto and an eject button 40 which is pushed when the memory card is to be removed from the card slot 38.

The other side end face (right-side end face in FIG. 2) is equipped with a container 42 for accommodating a battery such as a dry cell, and a strap belt 44 which is used when the camera body is held by a hand of an operator.

In the following, displayed contents of the liquid crystal display section 30 will be explained with reference to FIG. 3. In response to operations of the mode switch 32, select switch 34, and erase switch 36, a plurality of icon marks 46 to 66 are selectively displayed. Though these icon marks are selectively displayed according to operation modes, all the icon marks are shown in FIG. 3 in order to facilitate explanation.

The icon mark 46 indicates the photographing resolution: "S" indicates a state (referred to as "superfine mode") where photographing can be effected with the maximum resolution; "F" indicates a state (referred to as "fine mode") where photographing can be effected with a predetermined resolution lower than the maximum resolution; and "N" indicates a state (referred to as "normal mode") where photographing can be effected with a predetermined resolution lower than the fine-mode resolution.

The icon mark 48 indicates the flash photographing state. The icon mark 50 indicates the automatic focus detection mode and the close-up photographing mode. The icon mark 52 indicates the remaining capacity of the battery. The icon mark 54 indicates the manual zoom mode in which the zoom button 18 is operated so as to manually set zooming and the automatic zoom mode in which the camera itself automatically performs optimal zooming processing while automatically judging in-focus conditions.

The icon mark 56 mainly displays, in terms of segment, the number of so-called frame picture sheets which can be stored in the main memory MM or auxiliary memory (memory card) MC which will be explained later. In other words, the remaining storage capacity of the main memory MM or auxiliary memory MC is displayed as the number of sheets of images which can be recorded. The icon mark 58 indicates the timer photographing mode.

As a segment display smaller than the icon mark 56, the icon mark 60 mainly indicates the number of sheets of so-called frame pictures already stored in the main memory MM or auxiliary memory MC.

At the time of the copying mode which will be explained later, the icon mark 62 is displayed, indicating that the image data already stored in the main memory MM is being transferred and copied to the auxiliary memory MC.

The icon mark 64 indicates the state where the auxiliary memory (memory card) MC is attached to the card slot 38, whereas it is not displayed in the state where the auxiliary memory (memory card) MC is detached therefrom.

The icon mark 66 indicates a mode in which the image data already stored in the main memory MM or auxiliary memory MC is erased.

As the operator appropriately operates the mode switch 32, select switch 34, and erase switch 36, these icon marks 46 to 66 are selectively displayed while being switched over. Further, when one of these icon marks is designated so as to effect a deterministic operation, the operation mode of the camera can be selected or set, and the camera can be made to perform a desired operation corresponding to the displayed icon mark.

Figure 4:
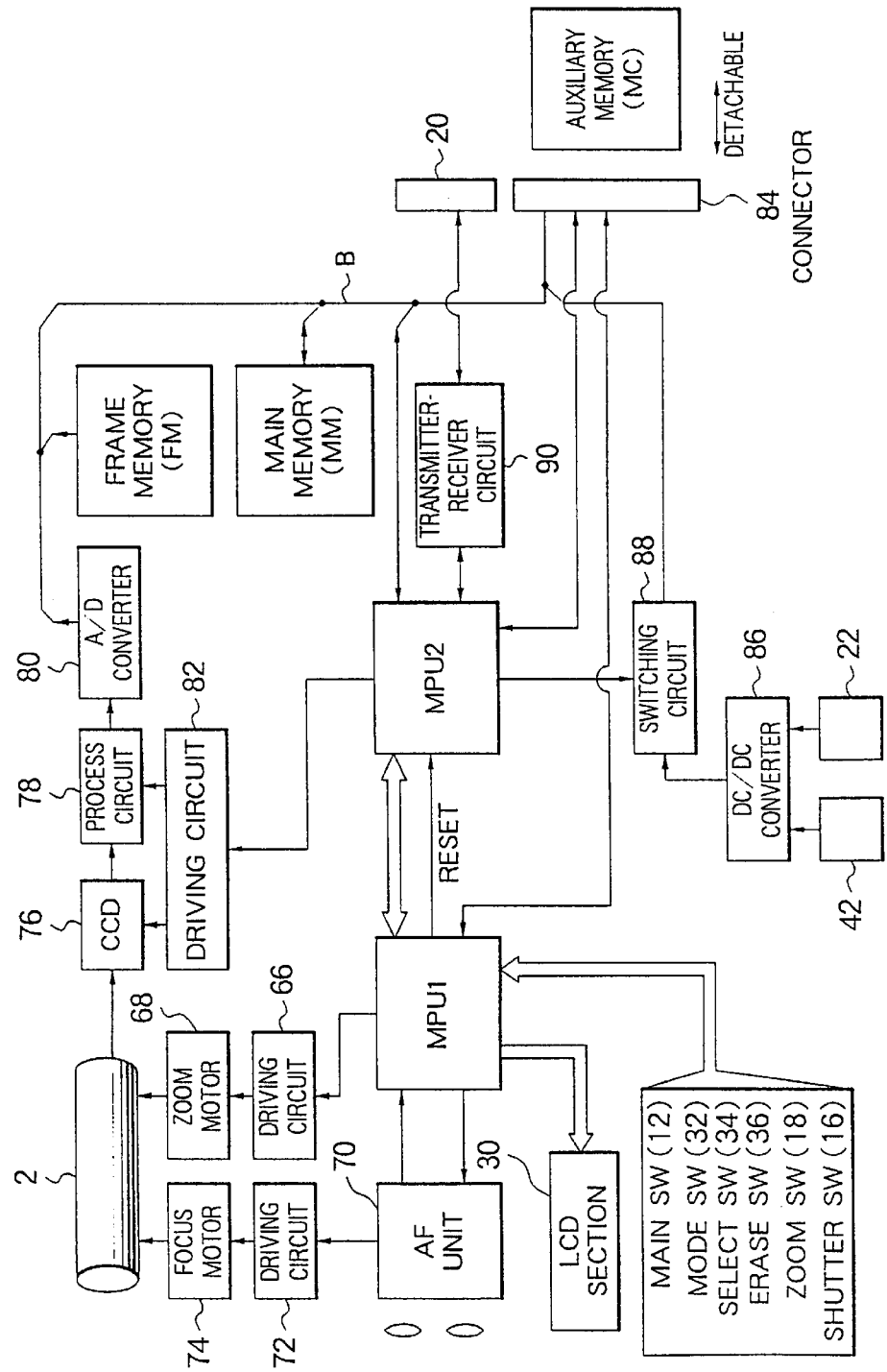
FIG. 4 is a block diagram showing a configuration of a circuit accommodated in the digital camera.

In the following, the configuration of main parts of the electric circuit accommodated in the camera body will be explained with reference to FIG. 4. In FIG. 4, constituents identical to those shown in FIGS. 1 to 3 are referred to with marks identical thereto.

In FIG. 4, as a controller for integrated control of operations of this digital camera, two pieces of microprocessors MPU1 and MPU2 are provided. These processors perform the integrated control by executing an application program which has been prepared on the basis of a predetermined algorithm and formed into firmware.

The microprocessor MPU1 detects the operations of the above-mentioned various operation switches and buttons 12 to 18 and 32 to 36, and controls the operation of the image pickup mechanism including the image pickup optical system 2 as well as the display operation of the liquid crystal display section 30 or the like. Also, the microprocessor MPU1 detects the operation of the zoom button 18 at the time of photographing mode, and drives, by way of a driving circuit 66, a zoom motor 68 so as to continuously move a zoom lens in the image pickup optical system 2 along the optical axis direction. Also, it instructs the automatic focus detector 4, which includes an automatic focus detecting unit 70, a driving circuit 72, and a focus motor 74, to perform distance-measuring and focusing processings. Further, it performs such a processing as detection of whether the auxiliary memory MC is attached to or detached from the camera.

In the photographing mode, the microprocessor MPU2 controls the operation of a photoelectric converting mechanism for photoelectrically converting an object light image transmitted through the image pickup optical system 2, so as to form predetermined image data. Also, it performs so-called data processing such as storing of these image data into the main memory MM or auxiliary memory MC or transferring and copying the image data from the main memory MM to the auxiliary memory MC in the copying mode. Further, it controls the program voltage supplied to the main memory MM and auxiliary memory MC.

Here, the above-mentioned photoelectric converting mechanism comprises a color CCD solid-state imaging device 76 for photoelectrically converting the object light image transmitted through the image pickup optical system 2 into an image signal; a process circuit 78 which performs such a processing as white balance adjustment with respect to the image signal output from the CCD solid-state imaging device 76; an A/D converter 80 which digitally converts the image signal output from the process circuit 78 into image data; and a CCD driving circuit 82 which synchronously controls these members according to instructions from the microprocessor MPU2.

Connected to a bus B of the microprocessor MPU2 are the A/D converter 80, a frame memory FM, the main memory MM, and a connector 84 for attaching the auxiliary memory MC thereto.

Here, the connector 84 is attached to the interior of the card slot 38 (see FIG. 2). The main memory MM is a permanent memory fixedly attached to the inside of the digital camera beforehand. Adopted as this memory is a non-volatile semiconductor memory such as a flush memory which is rewritable by so-called program voltage. It has a storage capacity such that image data corresponding to a plurality of sheets of so-called frame pictures can be stored therein. The memory card, which is the auxiliary memory MC, has a large storage capacity which can store image data corresponding to a number of sheets of so-called frame pictures which is greater the number of frame pictures which can be stored in the main memory MM.

In addition to so-called data bus and address bus and a control bus or the like for memory resetting and the like, the bus B has a power line for supplying the above-mentioned program voltage to the main memory MM and auxiliary memory MC. By way of this power line, the microprocessor MPU2 controls the supply of the program voltage to the main memory MM and auxiliary memory MC. Namely, a DC/DC converter 86 generates the above-mentioned program voltage from the battery in the container 42 or the external power source supplied by way of the connector 22, and the microprocessor MPU2 controls a switching circuit 88, whereby the program voltage is supplied to the main memory MM and auxiliary memory MC by way of the power line.

At the time of photographing, the microprocessor MPU2 causes the image data corresponding to one frame picture output from the A/D converter 80 to be temporarily stored into the frame memory FM and then, while subjecting thus temporarily stored image data to an image data compressing processing with a ratio of compression corresponding to a designated resolution, causes the image data to be stored into the main memory MM or auxiliary memory MC. Also, in the copying mode, the microprocessor MPU2 performs transfer control in which the image data is transferred from the main memory MM to the auxiliary memory MC by way of the bus B.

Further, connected to the microprocessor MPU2 is a transmitter-receiver circuit 90 for serially transmitting the image data to an external electronic device connected to the serial port 20.

Thus, the microprocessors MPU1 and MPU2 share control functions and synchronously operate so as to transfer various kinds of necessary data to each other.

In the following, main operations of this digital camera will be explained with reference to FIGS. 5 to 10.

Figure 5:
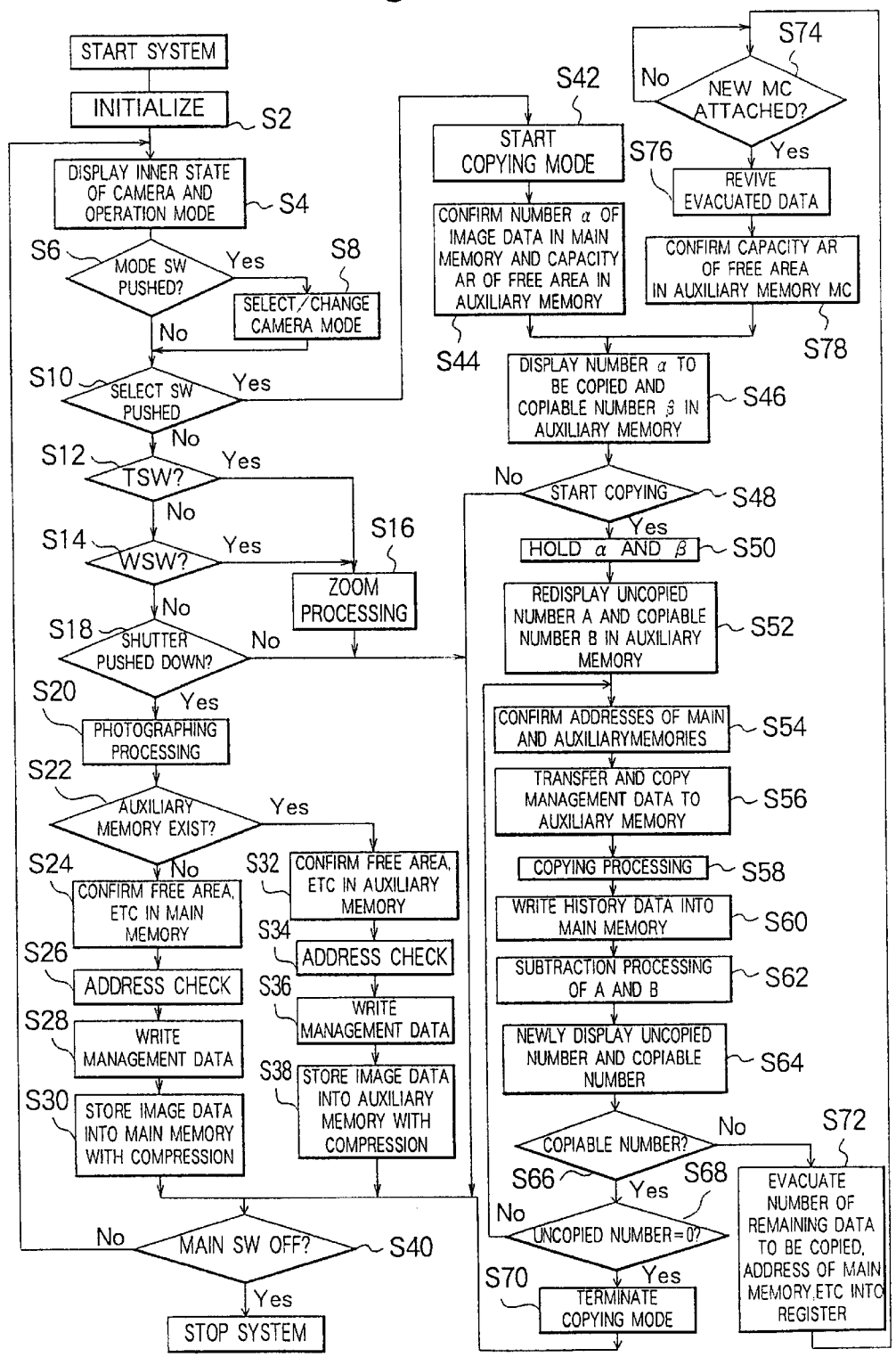
FIG. 5 is a flow chart for explaining operations of the digital camera.

In the flow chart of FIG. 5, when an operator moves the slide cover 12 and thereby turns on the main power source by way of the main switch, the microprocessors MPU1 and MPU2 initialize the whole camera system at step S2. Subsequently, at step S4, the microprocessors MPU1 and MPU2 make the liquid crystal display section 30 display the icon marks 46 to 66, thereby indicating the operation mode which has been set and stored since the last time the main power source was turned off after completion of photographing as well as the current inner state of the camera.

In such a state of display, when the auxiliary memory MC is not attached to the camera, the microprocessor MPU2 investigates number n of image data already stored (i.e., the number of sheets already photographed) in the main memory MM, divides the capacity of free area remaining in the main memory MM by a quantity of image data corresponding to one frame picture which is necessary when photographed with the currently set resolution, so as to determine number N of image data which can be stored (number of sheets which can be photographed), and then transfer these data n and N to the microprocessor MPU1. Then, as shown in FIG. 6, the microprocessor MPU1 displays, by means of the icon mark 60, the number n of the image data already stored in the main memory MM, while displaying, by means of the icon mark 56, the number N of the image data which can be stored (number of sheets which can be photographed) in the main memory MM. Further, by not displaying the icon mark 64, it also indicates that the camera is in a mode for storing image data into the main memory MM.

By contrast, when the memory card MC, i.e., auxiliary memory, is attached to the camera, the microprocessor MPU2 investigates number m of image data already stored (i.e., the number of sheets already photographed) in the auxiliary memory MC, divides the capacity of free area remaining in the auxiliary memory MC by a quantity of image data corresponding to one frame picture which is necessary when photographed with the currently set resolution, so as to determine number M of image data which can be stored (number of sheets which can be photographed), and then transfer these data m and M to the microprocessor MPU1. Then, as shown in FIG. 8, the microprocessor MPU1 displays, by means of the icon mark 60, the number m of the image data already stored in the auxiliary memory MC, while displaying, by means of the icon mark 56, the number M of the image data which can be stored (number of sheets which can be photographed) in the auxiliary memory MC. Further, by displaying the icon mark 64, it also indicates that the camera is in a mode for storing image data into the auxiliary memory MC.

Here, the microprocessor MPU1 electrically detects whether the auxiliary memory MC is attached to or detached from the connector 84, and then instructs the microprocessor MPU2 to perform the corresponding processing mentioned above.

Then, when the mode switch 32 is pushed, the microprocessor MPU1 detects it (step S6), and the operation proceeds to a mode changing processing (step S8) for selecting and changing the operation mode of the camera. This operation for changing and selecting the mode is effected as the operator appropriately manipulates the mode switch 32 and the select switch 34.

By contrast, when the select switch 34 is pushed without any selecting and changing of the operation mode being designated at step S6, the microprocessor MPU1 detects it (step S10) and, simultaneously, instructs the microprocessor MPU2 to perform a processing for a copying mode (steps S42 to S68).

When neither the mode switch 32 nor the select switch 34 is pushed, a normal photographing mode (steps S12 to S38) is taken.

Thus, as the operator arbitrarily manipulates the mode switch 32 and the select switch 34, various operation modes can be selected, and the image pickup mode or copying mode can be set.

In the photographing mode, the microprocessor MPU1 detects the pushing operation of the zoom switch 18 at steps S12, S14, and S16, and performs so-called zoom-in and zoom-out operations respectively according to the shifting of the zoom switch 18 toward the telephoto contact (TSW) side and the wide-angle contact (WSW) side.

Also, when the operator pushes down the shutter release button 16, the microprocessor MPUL detects it (step S18) and performs a photographing processing (step S20).

Namely, at step S20, the object image signal output from the color CCD solid-state imaging device 76 is converted into digital image data by the A/D converter 80, while thus obtained image data corresponding to one frame picture are temporarily stored in the frame memory FM.

Then, at step S22, the microprocessor MPU1 judges whether or not the auxiliary memory (memory card) MC is attached to the connector 84. In the case where the auxiliary memory MC is not attached thereto, the processing shifts to a storing mode (steps S24 to S30) for automatically recording the image data into the main memory MM. In the case where the auxiliary memory MC is attached to the camera, the processing shifts to a recording mode (steps S32 to S38) for automatically and preemptively recording the image data into the auxiliary memory MC.

In the above-mentioned case where the auxiliary memory MC is not attached to the camera, the microprocessor MPU2 investigates the storage capacity of the free area in the main memory MM (step S24), writes a predetermined management data FDATA into a predetermined storage area from the start address (steps S26 and S28), and then causes the image data in the frame memory 78 to be stored into the free area subsequent to the management data, while subjecting the image data to a data compressing processing corresponding to a designated resolution (step S30). After the image data corresponding to one frame picture are thus stored, one shot of photographing is completed. During a period in which the main power source is not turned off at step S40, the processing subsequent to step S4 is repeated so as to enable the next photographing operation.

Here, as the above-mentioned management data FDATA, intrinsic data, such as file name, for managing each image data in terms of file as well as data representing the number of copying operations or the like used in the copying mode which will be explained later are defined.

Figure 10:
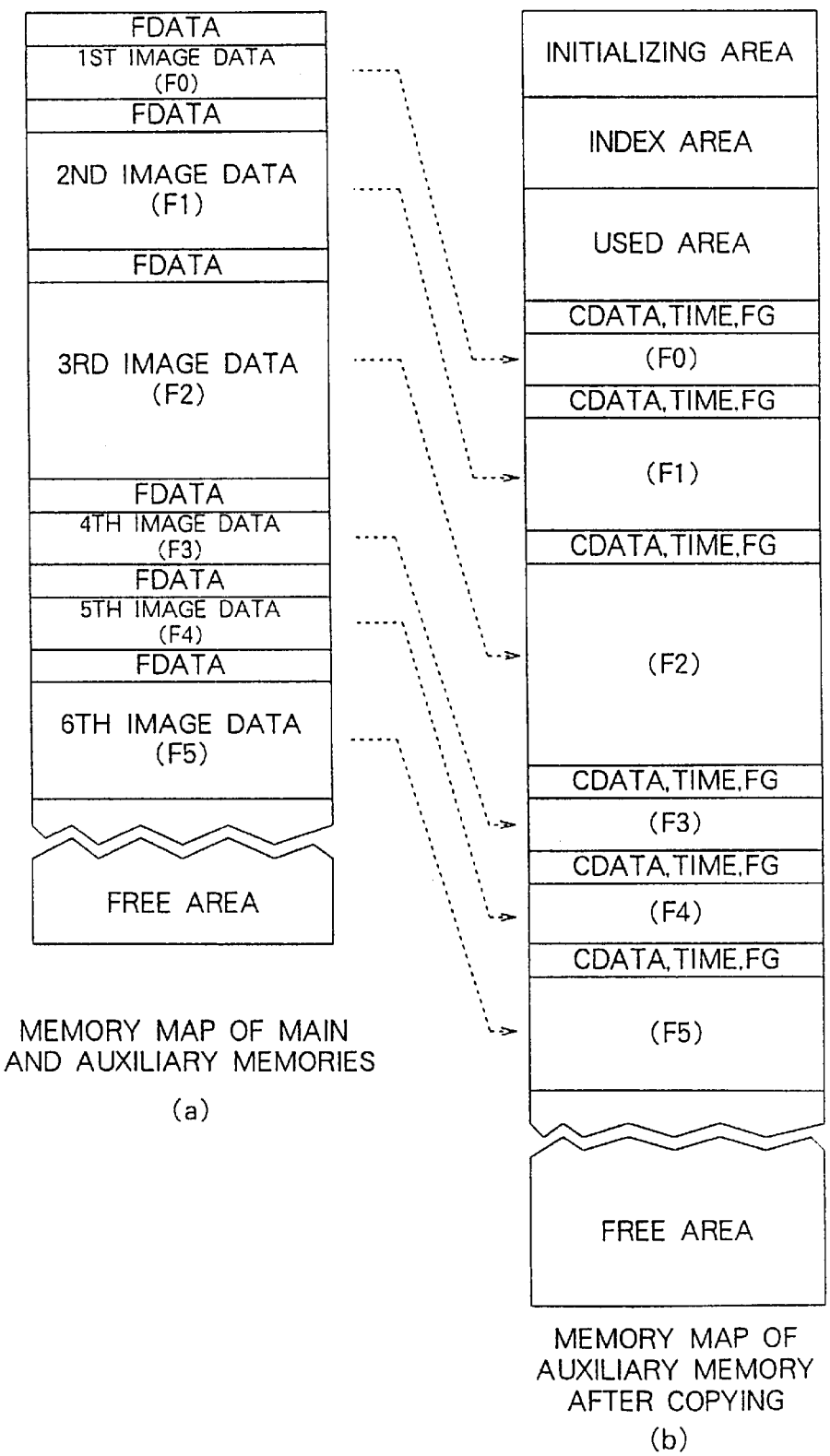
FIG. 10 is a memory map for explaining operations of photographing and copying modes.

The processing of steps S24 to S30 is repeated each time the photographing operation is effected, whereby image data F0 to F5 and so on respectively corresponding to designated resolutions are successively stored together with their management data FDATA as indicated by a memory map of the main memory MM shown in (a) of FIG. 10. Namely, at step S30, since the image data are compressed with a data compression ratio corresponding to the resolution designated by the operator, and then stored in the above-mentioned free area of the main memory MM, the capacity occupied by the image data corresponding to one frame picture in the free area of the main memory MM is maximized in the superfine mode, becomes the secondarily largest in the fine mode, and is minimized in the normal mode.

Further, as the processing of step S4 is performed each time the photographing operation is repeated, the displays of the number of sheets photographed and the number of sheets which can be photographed in the main memory MM are changed each time one shot of photographing is completed. Accordingly, as shown in FIG. 7, the number of sheets photographed which is displayed by the icon mark 60 increases one by one from n+1 to n+j, while the number of sheets which can be photographed is displayed by the icon mark 56 as decreasing from N1 to Nj.

Here, each value of the numbers N1 to Nj of sheets which can be photographed corresponds to the ratio of the capacity of the free area in the main memory MM to a designated resolution. Accordingly, even when the capacity of the free area is held constant, the values of the numbers N1 to Nj of sheets which can be photographed become smaller as the photographing operation is performed at a higher resolution (e.g., in the superfine mode), whereas these values become greater as the photographing operation is performed at a lower resolution (e.g., in the normal mode).

Therefore, each time one shot of photographing is completed, the operator can be provided with secure and clear information about the number of sheets which can be photographed in the main memory MM.

In the case where the auxiliary memory MC is attached to the camera, the microprocessor MPU2 investigates the storage capacity of the free area in the auxiliary memory MC (step S32), writes a predetermined management data FDATA into a predetermined storage area from the start address (steps S34 and S36) in the free area of the auxiliary memory MC, and then causes the image data in the frame memory 78 to be stored into the free area subsequent to the management data, while subjecting the image data to a data compressing processing corresponding to a designated resolution (step S38). After the image data corresponding to one frame picture are thus stored, one shot of photographing is completed. During a period in which the main power source is not turned off at step S40, the processing subsequent to step S4 is repeated so as to enable the next photographing operation using the auxiliary memory MC.

The processing of steps S32 to S38 is repeated each time the photographing operation is effected, whereby the image data F0 to F5 and so on respectively corresponding to designated resolutions are successively stored together with their management data FDATA as indicated by the memory map shown in (a) of FIG. 10. Namely, at step S38, since the image data are compressed with a data compression ratio corresponding to the resolution designated by the operator, and then stored in the above-mentioned free area of the auxiliary memory MC, the capacity occupied by the image data corresponding to one frame picture in the free area of the auxiliary memory MC is maximized in the superfine mode, becomes the secondarily largest in the fine mode, and is minimized in the normal mode.

Further, as the processing of step S4 is performed each time the photographing operation is repeated, the displays of the number of sheets photographed and the number of sheets which can be photographed in the auxiliary memory MC are changed each time one shot of photographing is completed. Accordingly, as shown in FIG. 9, the number of sheets photographed which is displayed by the icon mark 60 increases one by one from m+1 to m+k, while the number of sheets which can be photographed is displayed by the icon mark 56 as decreasing from M1 to Mk.

Here, each value of the numbers M1 to Mk of sheets which can be photographed corresponds to the ratio of the capacity of the free area in the auxiliary memory MC to a designated resolution. Accordingly, even when the capacity of the free area is held constant, the values of the numbers M1 to Mk of sheets which can be photographed become smaller as the photographing operation is performed at a higher resolution (e.g., in the superfine mode), whereas these values become greater as the photographing operation is performed at a lower resolution (e.g., in the normal mode).

Therefore, each time one shot of photographing is completed, the operator can be provided with secure and clear information about the number of sheets which can be photographed in the auxiliary memory MC.

Thus, when the auxiliary memory MC is attached to the camera, image data are automatically and preemptively stored not in the main memory MM but in the auxiliary memory MC which has a larger storage capacity.

Accordingly, though no particular difference exists in terms of operation for the operator between the case where image data are stored into the main memory MM and the case where they are stored into the auxiliary memory MC, the auxiliary memory MC with a larger capacity is attached to the camera when photographing is to be effected with a higher resolution or when a greater number of sheets are to be photographed.

Also, when the photographing operation is performed while the auxiliary memory MC is appropriately attached to or detached from the camera, the image data storing modes for the main memory MM and auxiliary memory MC are automatically switched over therebetween at step S22 according to whether the auxiliary memory MC is attached to the camera or not. Accordingly, without any particular operation necessitated, photographing with the main memory MM alone and photographing with the auxiliary memory MC can be alternately effected.

In the following, the operation where the copying mode is selected at the above-mentioned step S10 will be explained. Namely, when the microprocessor MPU1 detects that the select switch 34 is pushed, at step S42, it displays the icon mark 62 and, simultaneously, sends this detection information to the microprocessor MPU2, thereby starting the copying mode.

First, at step S44, the microprocessor MPU2 investigates number a of image data already stored (number of sheets recorded) in the main memory MM, investigates capacity AR of the free area remaining in the auxiliary memory MC, and then estimates number β which can be transferred and copied to the auxiliary memory MC (number of recordable sheets) at the currently set resolution. Here, since the image data photographed with a variety of resolutions are stored in the main memory MM, the remaining free capacity AR in the auxiliary memory MC and these image data with a variety of resolutions may be compared with each other so as to determine actual number β, of image data which can be copied. In order to shorten the processing time and so on, however, the number β of image data which can be transferred and copied to the auxiliary memory MC is estimated from the ratio of the currently set resolution to the free capacity AR remaining in the auxiliary memory MC.

Next, at step S46, as shown in display example #1 in FIG. 11, the microprocessor MPU1 makes the icon mark 56 display the number α of image data already stored in the main memory MM, while making the icon mark 60 display the estimated number β which can be copied to the auxiliary memory MC, and then waits till it is instructed to start copying. Accordingly, for example, when six pieces of image data F0 to F5 have already been stored in the main memory MM as indicated by the memory map in (a) of FIG. 10, the value α of the icon mark 56 becomes 6, whereas the value α of the icon mark 60 becomes the above-mentioned estimated number.

Thus, since the values α and β are displayed before copying is actually started, the operator can confirm the remaining capacity of the auxiliary memory MC or the like and, when this storage capacity is insufficient, it is indicated, for example, that the auxiliary memory MC should be replaced by another auxiliary memory MC' with a sufficient storage capacity.

Next, when the mode switch 32 and the select switch 34 are pushed together so as to instruct the camera to start copying, the microprocessors MPU1 and MPU2 detect it (step S48) and then cause the above-mentioned values α and β to be stored into predetermined internal registers (step S50). Subsequently, at step S52, as shown in display example #2 in FIG. 11, while number B of image data which can be copied to the auxiliary memory MC is displayed by the icon mark 56, number A of uncopied image data is displayed by the icon mark 60. Namely, the value B is equivalent to or greater than the value β shown in display example #1, while the value A is equivalent to the value α.

Next, the microprocessor MPU2 confirms the start address of the image data in the main memory MM to be initially copied and the start address of the free area in the auxiliary memory MC (step S54), and then the management data FDATA in the image data of the initial copying source is stored in the auxiliary memory MC as a new management data CDATA for the copying destination (step S56). Here, to the new management data CDATA, data TIME representing the date and time of copying as well as flag data FG representing the state of copying which will be explained later are added.

Then, the microprocessor MPU2 causes the first image data to be transferred and copied in succession to the management data FDATA (steps S58 and S60).

Here, the following operation should be noted in particular. At step S58, simultaneously as copying of one piece of image data is started, the microprocessor MPU2 simultaneously writes a flag data FG (binary 01) indicating that the copying has been started and is in progress; then, after image data for one picture sheet have been completely transferred and copied, at step S60, writes a flag data FG (binary 11) indicating that one sheet has been completely copied; and further, while adding 1 to the copied number data in the management data accompanying the image data in the main memory MM (copying source), re-stores the copied number data together with a data representing the date and time of copying.

Thus, the flag data FG indicative of the state during the copying processing is stored. Accordingly, for example, when the auxiliary memory MC is removed in the process of copying, the flag data FG=11 indicative of the completion of copying is not stored while only the copying start flag data FG=01 is left as being stored. Therefore, by investigating the contents of the flag data FG, the operator can judge whether copying has been done securely or not.

Also, since so-called history information of the number of copying and the date and time of copying is stored in the management data FDATA in the image data of the copying source, this processing is effective, for example, in preventing a third party from illegally performing a copying operation.

Next, at step S62, by subtracting 1 from the number A held in the above-mentioned predetermined internal register, the microprocessor MPU2 calculates number A−1 of uncopied image data in the main memory MM. Also, it reconfirms the free area capacity in the auxiliary memory MC again and computes number BF1 of copiable sheets, which is then stored in the above-mentioned inner register. Then, at step S64, as shown in display example #3 in FIG. 11, the microprocessor MPU2 makes the icon mark 56 display the number BF1 of the copiable sheets and, simultaneously, makes the icon mark 60 display the number A−1 of the remaining uncopied image data.

Here, the capacity of the copied image data varies in response to the resolution set at the time of photographing, thereby occupying a variable capacity in the auxiliary memory MC in response to a difference in the resolution. Accordingly, the number BF1 of copiable sheets decreases as the resolution is higher.

Next, the microprocessor MPU2 judges whether the remaining free capacity in the auxiliary memory MC is sufficient for transferring and copying the next image data thereto (step S66). Namely, when the number of copiable sheets in the auxiliary memory MC becomes zero while there remain image data to be copied, it is a state in which the next image data cannot securely be transferred and copied, whereby the operation shifts to the processing of step S72 which will be explained later. By contrast, when the number of copiable sheets is not zero, it is a state where the next image data can be securely transferred and copied, whereby the operation shifts to the processing of step S68.

Subsequently, at step S68, the microprocessor MPU2 confirms whether or not there are remaining uncopied image data and, when it is judged there are, repeats the processing subsequent to step S54 so as to transfer and copy the remaining uncopied image data in a manner similar to that mentioned above. After the whole image data is transferred and copied, the copying mode is terminated (step S70).

Thus, each time the individual image data is transferred and copied, the values of the icon marks 56 and 60 are changed as indicated by display examples #2 to #5 in FIG. 11. After the whole image data is transferred and copied, as indicated by display example #5 in this drawing, the value of the icon mark 60 becomes zero, indicating that the whole image data has been copied.

According to such a processing of copying mode, for example, when six pieces of image data F0 to F5 have already been stored in the main memory MM as indicated by the memory map in (a) of FIG. 10, after the copying processing, all the image data F0 to F5 are copied into the auxiliary memory MC in the same order with their respective management data added thereto as indicated by a memory map of the auxiliary memory MC shown in (b) of FIG. 10.

Thus, by simply seeing that the value of the icon mark 60 has become zero, the operator can easily judge that the whole image data has completely been copied.

Here, in the case where the capacity of the storable area in the auxiliary memory MC has become insufficient before the whole image data in the main memory MM is completely transferred and copied, unlike display example #5 in FIG. 11, the value (copiable number) in the icon mark 56 initially becomes zero, while the value of the icon mark 60 indicates the number ($\neq 0$) of uncopied image data.

At step S66, such a state where the free capacity in the auxiliary memory MC is insufficient while there remain uncopied image data (state where the next transferring and copying operation cannot be effected) is detected, and the operation shifts to the processing of step S72 so as to respond to this state.

First, the microprocessor MPU2 causes data such as the number of uncopied image data remaining in the main memory MM (number of remaining data to be copied) and the start address of the uncopied image data to evacuate into a predetermined inner register (step S72) and, with the current auxiliary memory (memory card) MC detached therefrom, waits till another auxiliary memory (memory card) MC is attached thereto (step S74). Then, when the microprocessor MPU1 detects attachment of another auxiliary memory (memory card) MC (step S74), the microprocessor MPU2 revives thus evacuated data (step S74) and then investigates the capacity AR of the free area in the auxiliary memory MC newly attached, thereby estimating the number P of image data which can be transferred and copied to the auxiliary memory MC (number of recordable sheets) at the currently set resolution (step S78).

Then, as the operation continues to the processing subsequent to the above-mentioned step S46, the remaining image data in the main memory MM are transferred and copied to the new auxiliary memory MC.

Thus, even when the storage capacity of the auxiliary memory MC becomes insufficient during copying, the operator can view such a situation with the icon marks 56 and 60, and further can continue copying to a new (another) auxiliary memory MC.

Here, even after such a copying processing is completed, the image data in the main memory MM are held as they are unless the erase switch 36 is operated.

After the copying mode is completed, the processing from step S4 is started again, whereby the above-mentioned setting of operation mode as well as setting of photographing mode and copying mode, again, can be effected. Also, when the auxiliary memory MC used for copying is not detached from the camera and has a sufficient storage capacity, the above-mentioned photographing mode (steps S32 to S38) with the auxiliary memory MC is taken; whereas the above-mentioned photographing mode (steps S24 to S30) with the main memory MM is taken when the auxiliary memory MC used for copying is detached therefrom.

As explained in the foregoing, this embodiment has a copying mode in which image data stored in the main memory accommodated in the camera can be copied, and sequentially displays the number of image data in the main memory, i.e., copying source, and the number of image data which can be copied to the auxiliary memory MC, i.e., copying destination. Accordingly, the operator can be provided with information about the state of copying and the like, whereby a digital camera with an excellent operability can be provided.

Also, while predetermined management data are added to individual image data stored in the main memory MM or auxiliary memory MC in the normal photographing mode, the management data in the main memory MM are copied in conjunction with the individual image data to be copied to the auxiliary memory MC. Accordingly, this embodiment yields excellent effects in that the identity of the copied image data can be improved, while so-called data management can be facilitated.

Further, in the copying mode, since the state of individual image data being transferred and copied is managed by writing of the predetermined flag data FG, it can be securely judged whether the individual image data have been normally copied or not.

Also, this digital camera is provided with an abnormality monitoring means which prevents the main memory MM, the auxiliary memory MC, and the bus B from malfunctioning or being damaged not only at the time of the above-mentioned copying mode but also when the auxiliary memory MC is suddenly attached to or detached from the camera during when various data are being transferred by way of the bus B.

Figure 12:
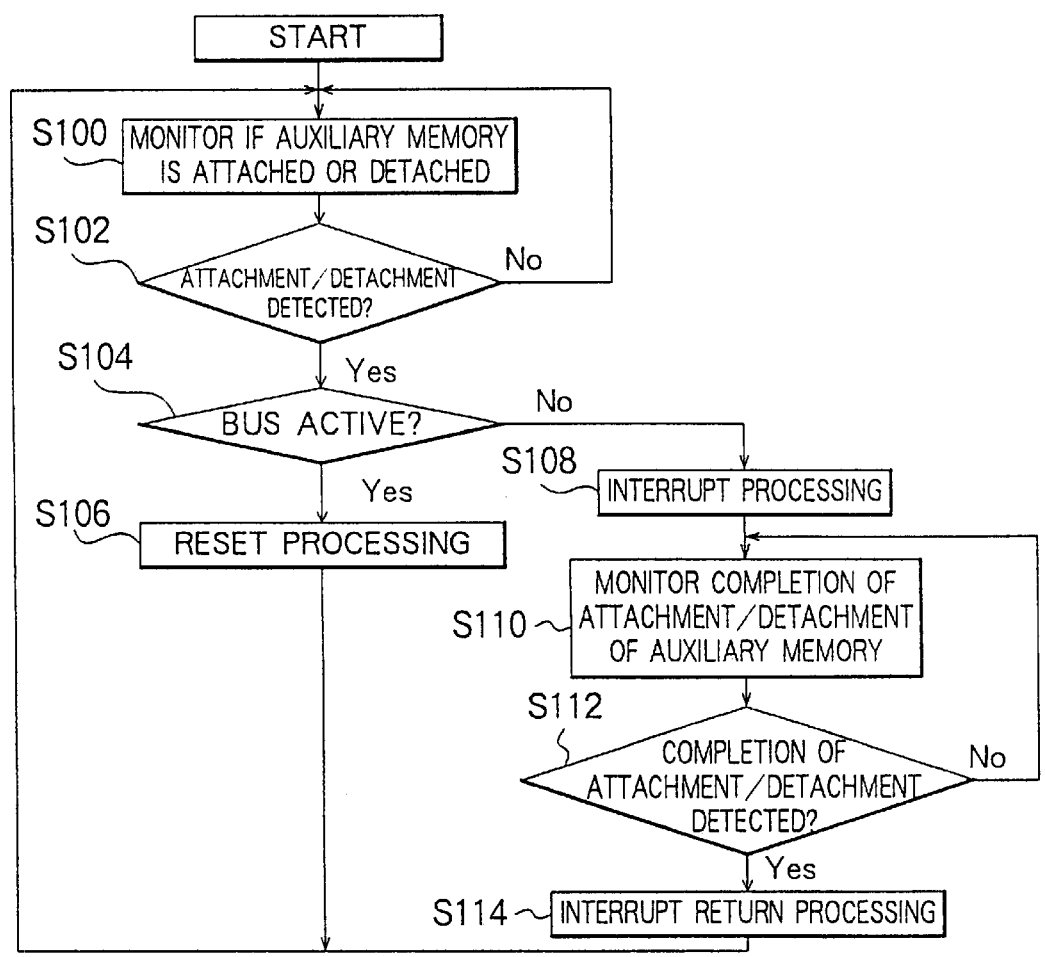
FIG. 12 is a flow chart for explaining the principle and operation of an abnormality monitoring means.

This abnormality monitoring means is realized by the microprocessors MPU1 and MPU2 in FIG. 4 as they execute an abnormality monitoring program which has been prepared on the basis of a predetermined algorithm indicated by a flow chart of FIG. 12 and formed into firmware.

Also, when such an abnormal state is generated, this abnormality monitoring program is preemptively executed independently from the processing operation indicated in the flow chart of FIG. 5.

With reference to FIG. 12, the principle and operation of the abnormality monitoring process will be explained. At step S100, the microprocessor MPU1 detects and monitors whether the auxiliary memory MC is attached to or detached from the camera and the timing of the attaching or detaching operation.

Then, when the microprocessor MPU1 judges that there has been an attaching or detaching operation of the auxiliary memory MC (step S102), it is investigated whether the bus B is in an active state or not (step S104). Namely, when the bus B is in so-called in-use state, such as the case where image data are being transmitted to the frame memory 72, the main memory MM, or the auxiliary memory MC by way of the bus B at the time of image pickup mode, the case where image data are being transmitted from the main memory MM to the auxiliary memory MC in the copying mode, and the case where supply of the above-mentioned program power source is being controlled, it is judged that the bus active state is established.

Then, when the microprocessor MPU1 judges that the bus is in the active state, it supplies a reset signal RESET to the microprocessor MPU2, thereby making the microprocessor MPU2 stop the foregoing processing operation, while forcibly making the microprocessor MPU2 perform a reset (initializing) processing (step S106). Accordingly, the processing subsequent to step S2 shown in FIG. 5 is restarted.

By contrast, when it is judged that the bus in not in the active state, from step S104, the processing of steps S108 to S114 is executed. Namely, when the auxiliary memory MC is attached to or detached from the camera when the bus B is not in the active state, without the forcible reset processing at step S106 being performed, the microprocessors MPU1 and MPU2 perform a known interrupt processing at step S108, thereby holding, in a predetermined shelter register, various kinds of data indicative of the inner state of the camera.

Then, at steps S110 and S112, when the microprocessor MPU1 judges that the attachment or detachment of the auxiliary memory MC has been completed, i.e., that the auxiliary memory MC is in a state where it is continuously detached from or attached to the camera, the processing shifts to step S114, at which a known interrupt return processing is performed, whereby the control operation is started from the state before the auxiliary memory MC is attached or detached.

Namely, even in the case where attachment or detachment of the auxiliary memory MC occurs, when the bus B is not in the active state, there is no problem such as noise being superposed onto image data or the like. Also, since no high-speed data transmission is effected, there is a margin in terms of time. Accordingly, a normal interrupt processing is effected.

When a forcible reset processing is performed when attachment or detachment of the auxiliary memory MC has occurred where the bus B is in the active state, the following effects are attained.

When attachment or detachment of the auxiliary memory MC occurs where the bus B is in the active state, there may be problems such as lowering of reliability due to noises superposed onto image data and the like which are being transmitted. Since initialization is made by resetting, these problems can be eliminated.

When such problems are to be eliminated by so-called interrupt processing, the state before the interrupt processing is regained after various data are evacuated, thereby making it impossible to realize a fast eliminating processing. By contrast, as the reset processing is performed in this embodiment, a fast eliminating processing can be realized.

Here, though the data on the bus B disappear upon such a forcible reset processing, the image data once stored in the main memory MM or auxiliary memory MC made of a non-volatile semiconductor memory do not disappear. Accordingly, so-called accidental information breakdown does not occur.

Also, when attachment or detachment of the auxiliary memory MC occurs where the bus B is in the active state, the program sequence (writing sequence) of the main memory MM and auxiliary memory MC can be forcibly and easily initialized. In particular, it becomes unnecessary for the power line or the like in the bus B, which is used for supplying the program voltage or the like to the main memory MM and auxiliary memory MC, to be switched over in order to perform an eliminating processing. Accordingly, while the system for switching the bus can be omitted, it becomes unnecessary for the disorder of the bus or the like to be taken into consideration.

Further, as the above-mentioned reset processing and the normal processing are selectively executed, effects such as those explained in the following can be obtained.

In a typical system adopting a microprocessor, in order to connect constituents such as connectors and I/O ports or external devices to a bus, these constituents are always connected to the bus by way of an I/O buffer circuit (bidirectional tristate buffer circuit), while unused I/O buffers are controlled so as to be in their off state (high-impedance state), whereby only necessary constituents are substantially connected to the bus so as to prevent intrusion of external noise and interference beforehand.

In the digital camera of the present invention, however, the number of parts should be reduced as much as possible in order to attain a smaller size and lighter weight as well as a lower power consumption. Accordingly, great effects can be attained even when the I/O buffer, which has been considered essential in general, is omitted.

Therefore, in this embodiment, without the above-mentioned I/O buffer being provided, the microprocessor MPU2, the frame memory FM, and the main memory MM as well as the A/D converter 80 and the connector 84 are directly connected to the bus B.

When the auxiliary memory MC is attached to or detached from the connector 84, a certain fluctuation is clearly rendered to the bus B. When the bus B is not in the active state, the normal interrupt processing is performed so as to cope with this situation, since no abnormality is generated in the camera system. When the bus B is in the active state, it becomes an obvious cause for superposing noise onto the image data being transmitted or the like. Accordingly, the reset processing is forcibly effected.

As a result, while generation of abnormality such as malfunctioning of the camera can be skillfully eliminated, the number of parts such as the I/O buffer and the bus switching system, at least, can be greatly reduced, whereby the camera can attain a small size and light weight as well as a low power consumption.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 228114/1995 filed on Sep. 5, 1995 is hereby incorporated by reference.

What is claimed is:

1. A digital camera for photographing an object to obtain an image signal, converting said image signal into digital image data, and recording said image data, said digital camera comprising:

a main memory for storing said image data;

a data bus connected to said main memory and having a connector suitable for attaching and detaching a detachable auxiliary memory to said data bus;

a controller designates a plurality of modes of operation and, in a copying mode, causes the image data in said main memory to be transferred and copied to said auxiliary memory, said controller further being capable of detecting whether said auxiliary memory is detached from said connector during a transfer of said image data to or from said main memory and upon said detection forcibly initializing all elements of said digital camera, said controller further including a microprocessor capable of supplying a reset signal when said data bus is active and further capable of storing said digital image data in a predetermined shelter register when said data bus is inactive; and a display device which, according to the mode of operation designated by said controller, sequentially displays number of uncopied image data remaining in said memory and number of image data which can be copied to said auxiliary memory.

2. A digital camera according to claim 1, wherein, while causing the image data in said main memory to be transferred and copied to said auxiliary memory, said controller adds management data indicating fact of copying to each image data.

3. A digital camera according to claim 1, wherein said controller adds, to each image data which is to be copied, a flag data indicating that copying of each data is in progress, and adds, upon completion of copying of each image data, a flag data indicating the completion of copying to said image data which is to be copied.

4. A digital camera according to claim 1, wherein said controller sequentially detects a free capacity of said auxiliary memory; upon detection of shortage of the free capacity in said auxiliary memory before the whole image data in said main memory is completely transferred and copied, temporarily stops transferring and copying operations in progress; and, after detecting that a new auxiliary memory is attached to said connector, causes remaining image data to be transferred and copied to said new auxiliary memory.

5. A digital camera according to claim 1, wherein said controller sequentially monitors whether said auxiliary memory is attached to or detached from said connector and, upon detection of attachment or detachment of said auxiliary memory during transfer of said image data to said main memory or said auxiliary memory when said object is being photographed, forcibly initializes each element within said digital camera.

6. A digital camera according to claim 1, wherein said controller sequentially monitors whether said auxiliary memory is attached to or detached from said connector and, upon detection of attachment or detachment of said auxiliary memory during transfer of said image data to said main memory or said auxiliary memory when the image data in said main memory are being copied to said auxiliary memory, forcibly initializes each element within said digital camera.

* * * * *